United States Patent [19]

Bishop et al.

[11] 3,949,973

[45] Apr. 13, 1976

[54] UNDERCUT FEED SECTION SCREW

[75] Inventors: Thomas G. Bishop, Mount Gilead; William T. Flickinger, Marion, both of Ohio

[73] Assignee: Koehring Company, Milwaukee, Wis.

[22] Filed: July 5, 1974

[21] Appl. No.: 485,949

[52] U.S. Cl. .................. 259/191; 259/10; 425/208
[51] Int. Cl.² .......................................... B29B 1/10
[58] Field of Search ............ 259/191, 192, 193, 97, 259/9, 10; 425/207, 208, 209

[56] References Cited
UNITED STATES PATENTS

| | | | |
|---|---|---|---|
| 3,115,674 | 12/1963 | Schrenk et al. | 259/191 |
| 3,149,377 | 9/1964 | Morse | 425/207 |
| 3,300,811 | 1/1967 | Berger | 259/192 |
| 3,496,603 | 2/1970 | Listner et al. | 425/208 |
| 3,535,737 | 10/1970 | Hendry | 259/191 |
| 3,752,449 | 8/1973 | Schwab et al. | 259/191 |
| 3,825,235 | 7/1974 | Schwertfeger et al. | 259/191 |
| 3,850,415 | 11/1974 | Hansen | 259/191 |

*Primary Examiner*—Richard E. Aegerter
*Assistant Examiner*—L. Footland
*Attorney, Agent, or Firm*—Burns, Doane, Swecker & Mathis

[57] ABSTRACT

A screw for injection molding of synthetic resinous material having a tendency to abrade and score the injection molding apparatus is provided along a substantial length of the feed section with a substantially undercut screw flight. An average particle of synthetic resinous feed stock material may pass between the undercut screw flights and a cooperating barrel without squashing. The undercut screw flights are effective to provide a controlled feed pressure for the particulate material entering the downstream portion of the screw.

7 Claims, 4 Drawing Figures

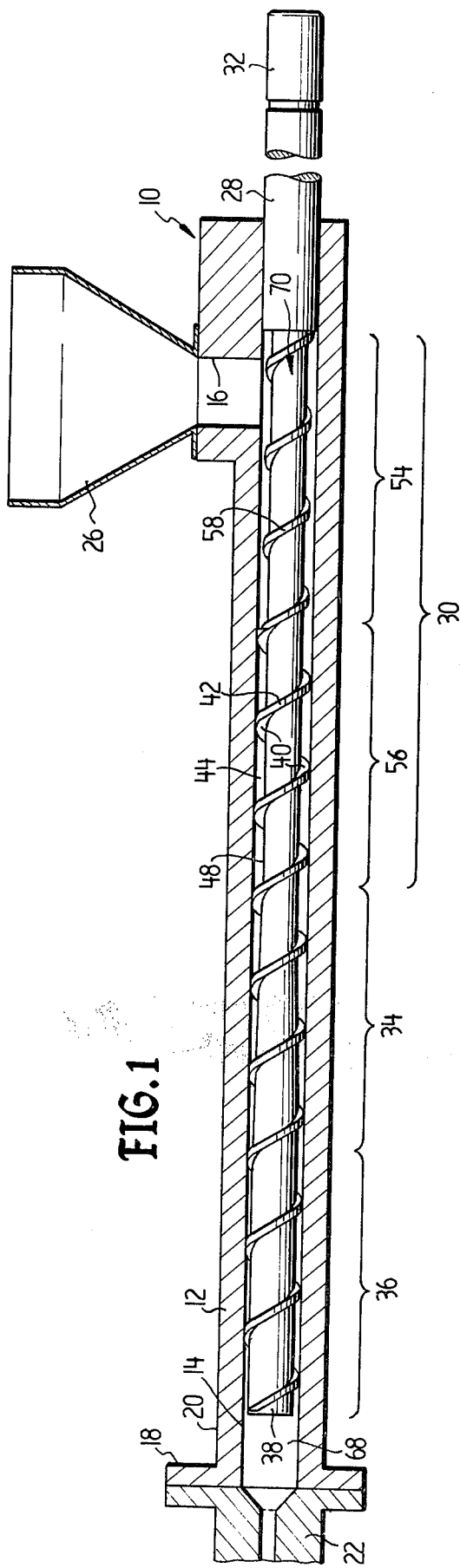
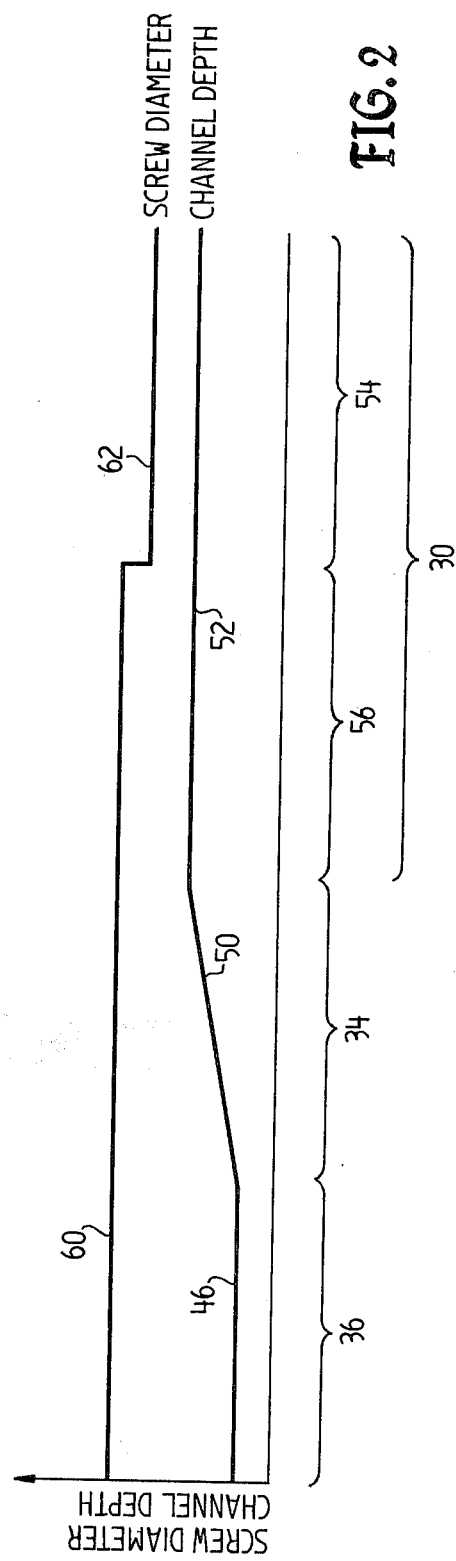

UNDERCUT FEED SECTION SCREW

BACKGROUND OF THE INVENTION

This invention relates generally to injection molding apparatus for particulate synthetic resinous material which has a tendency to score internal surfaces of the apparatus. More specifically, the invention concerns a screw design which reduces the torque requirements imposed on the screw drive and which substantially eliminates scoring of cooperating surfaces of the barrel and the screw of an injection molding machine.

Rotary screws have long been used in injection molding apparatus to accept synthetic resinous material in solid particulate form and plasticize the material into a viscous fluid for subsequent injection into hollow molds. In the past, some synthetic resinous materials, such as polyurethane, have been known to impose high torque requirements on the screw drive and to exhibit an undesirable tendency to score and abrade cooperating interior surfaces of processing machinery. Surfaces which are typically damaged include the bore of the housing, the rotary screw and the flights of the rotary screw. The provision of high torque capacity is expensive and represents a generally undesirable approach to adapting molding machines for the processing of polyurethane and other tough resins.

Surface scoring eventually requires replacement or reworking of the affected parts with the appurtenant expense and loss of production time. Since injection molding apparatus is conventionally used in commercial operations, such expense and time loss become economically significant and minimization thereof becomes highly desirable.

Overfeeding of particulate material caused by the design of the rotary screw is a significant factor in the scoring problem. Where overfeeding does occur, individual particles of feed stock material are caught and wedged between flights of the screw and the bore of the housing. In addition to screw design, overfeeding may result from the inability of downstream portions of the screw to physically accept more material as a result of existing back pressure in plasticized material.

The prior art discloses apparatus having a small carefully controlled clearance which insignificantly affects operation of the screw and, therefore does not address the overfeeding problem. In addition, preferentially abradable materials are disclosed for fabrication of screw portions thus increasing the number of parts required, the expense of the apparatus, and the frequency of repairs.

Other concepts such as the use of specialized materials for the barrel or screw or specialized surface treatment to inhibit scoring and abrasion have also been employed in the past. These, however, do not deal with the causes of the scoring.

Thus, the previously known attempted solutions to the problem of scoring and abrasion have not been entirely satisfactory or effective. Moreover, since scoring and abrasion commonly results simply from overfeeding particulate material, failure to address and solve the cause of scoring severely limits the utility of previously proposed solutions.

Accordingly, it would be desirable to have a screw for use in injection molding apparatus which not only reduces the torque requirements imposed on the screw drive, but also substantially reduces scoring and abrasion of internal surfaces while simultaneously minimizing the most common cause thereof.

SUMMARY OF THE INVENTION

It is a general object of this invention to provide a novel injection molding machine which substantially eliminates problems of the type noted above.

A further object of this invention is to provide a novel controlled torque injection molding machine that is relatively free from overfeeding which comprises a common cause of scoring and abrasion of internal surfaces.

Another object of this invention is to provide a novel method of reducing wear caused by scoring and abrasion on the internal surfaces of injection molding machines.

A still further object of this invention is to provide a novel method of providing a controlled pressure for feed material in an injection molding machine.

An injection molding machine intended to substantially accomplish the objects of this invention includes a generally cylindrical barrel having a longitudinal bore and a generally radial feed opening, a feed hopper aligned with the feed opening and operable to supply feed stock of synthetic resinous material in particulate form to the feed opening, and a screw mounted within the longitudinal bore for rotary and reciprocating movement relative to the barrel. The screw includes a feed section at one end, a transition or compression section and a metering section. A substantial length of the feed section has screw flights which are undercut by a radial distance roughly equivalent to the average diameter of a particulate feed stock.

BRIEF DESCRIPTION OF THE DRAWINGS

The above objects and many others will be apparent to one skilled in the art when the appended claims are read in conjunction with the following detailed description and the attached drawings wherein like reference numerals have been applied to like parts and wherein:

FIG. 1 is a partial elevational view of a preferred embodiment of an injection molding machine incorporating a screw according to the present invention;

FIG. 2 is a graph illustrating the variation of both channel depth and screw flight external diameter along the length of the screw of FIG. 1;

DETAILED DESCRIPTION OF A PREFERRED EMBODIMENT

Figure 3:
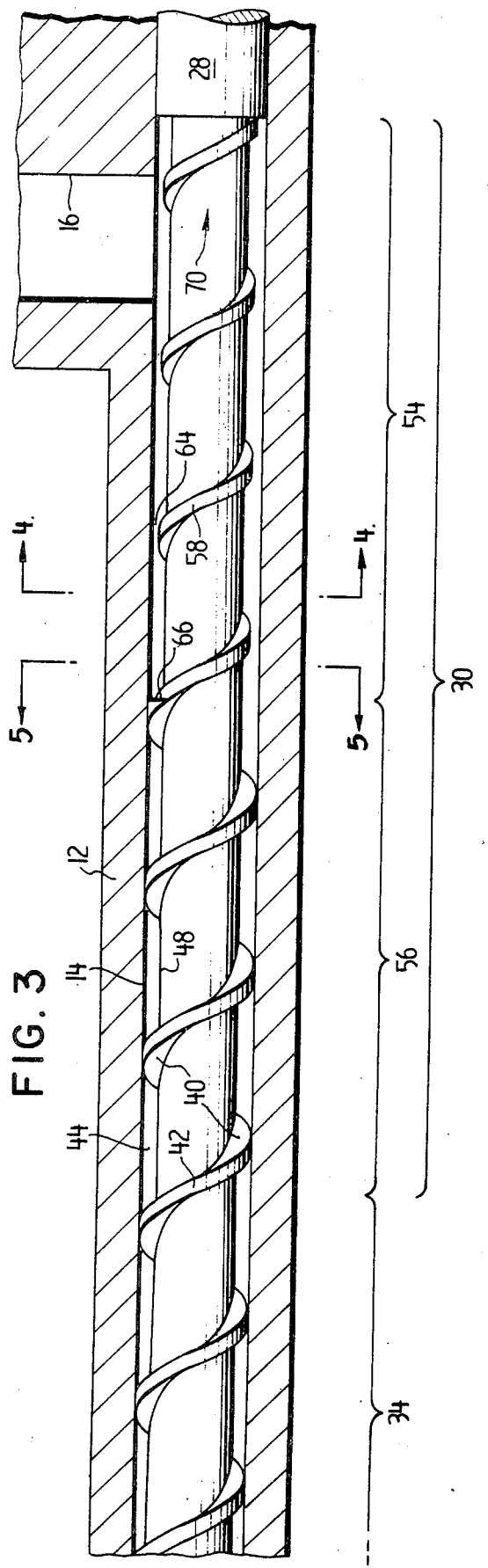
FIG. 3 is an enlarged view in partial cross section of the undercut screw in the feed portion of the injection molding machine of FIG. 1.

Illustrated in FIG. 1 is an injection molding machine 10 according to a preferred embodiment of this invention which includes generally cylindrical barrel means 12 having a cylindrical bore 14 extending coaxially therethrough and a generally radially disposed feed opening 16. An outwardly extending radial flange 18 may be provided at the outlet end 20 of the barrel 12 and may be secured by suitable connection means, such as bolts, to an adaptor 22 which communicates with a suitable mold.

The feed opening 16 preferably is vertically disposed and opens upwardly in proximity to the inlet end of the barrel means 12. A feed hopper 26 is disposed above the feed opening 16 and communicates therewith.

The barrel 12 includes a generally cylindrical logitudinal screw-receiving bore 14 in which a steel screw 28 is mounted for both rotational and reciprocating movement relative thereto. One end 32 of the screw means 28 projects from the inlet end of the barrel means 12 and may be connected with suitable driving apparatus, not shown, which causes the rotational and reciprocating motion. The screw 28 has a nominal diameter and a length substantially exceeding the screw diameter. Typically, the screw flight length may be on the order of 20 times the screw diameter.

A substantial portion of the length of the screw means 28 includes a screw flight 40 which extends radially outwardly and is provided with a generally flat land 42 at the radially outermost edge thereof. The screw 28 also includes a generally helical channel 44 having a depth that varies along the length of the screw 28. As may be seen from FIG. 1, the channel 44 extends along a substantial length of the screw means 28.

A feed section 30 is provided at one end of the screw 28. A metering section 36 is positioned at the outlet end 38 of the screw 28 and a transition or compression section 34 is disposed between the feed section 30 and the metering section 36.

In the metering section 36 of the screw 28, the helical channel 44 has a uniform shallow depth 46 (see FIG. 2). Channel depth for purposes of this invention is defined as the distance measured from the screw diameter to the bottom or root 48 of the channel 44. Channel depth may be determined by measuring the diameter of the screw in the channel root 48 and substracting this diameter from the diameter of the land 42 and dividing the difference by two.

Returning to FIG. 1, the transition section 34 of the screw 28 is disposed upstream of the metering section 36. The transition section 34 may be contiguously disposed with respect to the metering section 36. The channel depth 50 (see FIG. 2) in the transition section 34 may increase by a factor of 2 or more from a relatively low value at the downstream end of the transition section 34 to a substantially greater value at the upstream end of the transition section 34. Where the transition section 34 and the metering section 36 are contiguous, the channel depth 50 at the downstream end of the transition section 34 should coincide with the channel depth 46 of the metering section 36 to establish a smooth variation of channel depth.

Turning now to FIG. 3, the feed section 30 of the screw 28 is shown in greater detail. The feed section 30 is upstream of the transition section 34 and may be contiguous therewith. When the sections 30, 34 are contiguous, the channel depth 50 (see FIG. 2) of the upstream end of the transition section 34 preferably corresponds to the channel depth 52 of the feed section 30 in order to promote a smooth variation of channel depth. The channel depth 52 is generally uniform and has a magnitude substantially greater than the channel depth 46 of the metering section 36.

The feed section 30 includes an inlet portion 54 and an outlet portion 56 (see FIG. 3) which may be distinguished from one another by the fact that the screw flight 40 in the inlet portion 54 has a land 58 and is substantially undercut relative to the screw flight 40 and the land 42 in the outlet portion 56. In addition, the inlet portion 54 is disposed at a location 70 on the screw 28 which is aligned with the feed opening 16 throughout reciprocating movement of the screw 28. By reference to FIG. 2 it will become apparent that the screw diameter 60, which generally corresponds to the diameter of the land 42 and the nominal diameter of screw 28, is substantially uniform and constant throughout the metering section 36, the transition section 34 and the outlet portion 56 of the feed portion 30. It will also be noted that the screw diameter 62 in the inlet portion 54 of the feed section 30 is undercut and substantially less than the diameter 60. The difference between the screw diameter 60 and the screw diameter 62 is preferably determined to permit an average particle of particulate feed stock material to slip over the undercut screw flight 40. Typically, particulate material feed stock may comprise generally cylindrical pellets having an average diameter on the order of 1/16 to 3/32 of an inch and a typical length on the order of ¼ of an inch. For this feed stock the screw flight 40 should be undercut by slightly more than the average pellet diameter.

The diameter 60 must be slightly less than the diameter of the cylindrical bore 14 to allow the screw 28 to rotate therein. Accordingly, a small radial clearance on the order of several one-thousandths of an inch exists between the land 42 of screw flight 40 and the bore 14 throughout the metering section 36, the transition section 34, and the outlet portion 56 of the feed section 30. The small clearance has minimal effect on the operation of the apparatus.

Figure 4:
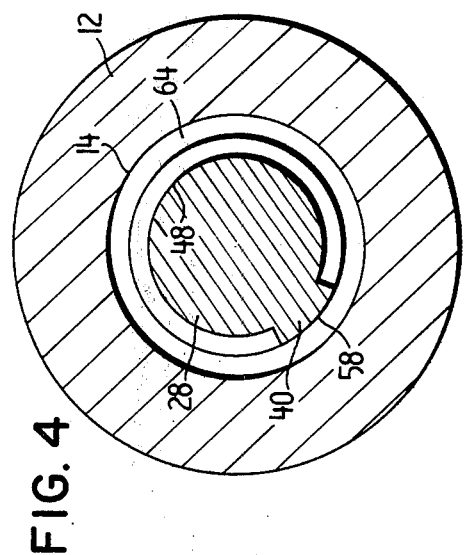
FIG. 4 is an enlarged cross-sectional view taken along line 4—4 of FIG. 3.

By virtue of the substantially reduced diameter 62 of the screw 28 in the inlet portion 54 of the feed section 30, a generally annular space 64 is defined between the land 58 and the bore 14 of the barrel 12. By examining the enlarged cross-sectional view in FIG. 4, the radial extent of the annular space 64 will be more easily seen in relation to the screw 28 and the barrel 12.

Figure 5:
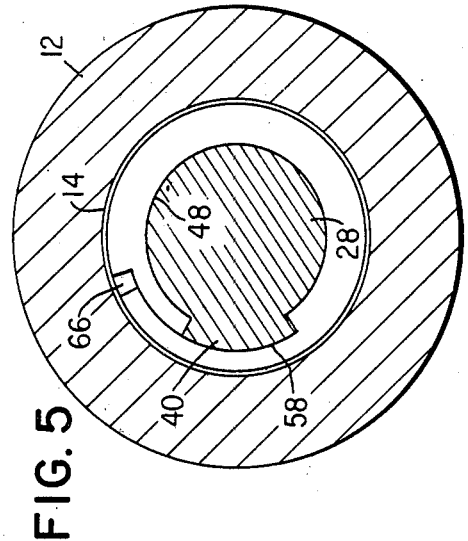
FIG. 5 is an enlarged cross-sectional view taken along line 5—5 of FIG. 3.

The transition between the screw diameters 60, 62 in the respective portions of the screw 28 may occur at a relatively abrupt shoulder 66 as most clearly illustrated in FIG. 5. While a more gradual transition might be provided, the shoulder 26 is preferable since it reduces the probability that particles of feed stock will become wedged between the land 42 and the bore 14.

By defining the radial extent of the undercut with respect to the average diameter of feed material, an average particle will be able to flow rearwardly over the land 58 of the screw flight 40 in the inlet portion 54 of the feed section 30 without being squashed between the land 58 and the bore 14. Allowing such a movement of particles with respect to the screw flights 40 and their associated land 58 in the portion 54 reduces the probability that the particulate material will become wedged between the screw flight 40 and the bore 14 of the barrel 12 and damage those respective surfaces.

In operation of an injection molding machine according to this invention, the hopper 26 (see FIG. 1) of the injection molding apparatus 10 is filled with particulate synthetic resinous material, such as pellets. The particulate material is subsequently admitted through the feed opening 16 to the channel 44 and the annular space 64 in the inlet portion 54 of the feed section 30. The screw 28 rotates at a generally uniform angular velocity to convey the particulate material in the channel 44 forwardly through the machine. The screw flight 40 engages the material and drags it through the inlet portion 54 toward the outlet portion 56 of the feed section 30. The particulate material is simultaneously compressed, compacted and heated as the plasticization process begins.

It is known that all the particulate material does not melt simultaneously as it is conveyed through the feed section 30. Similarly, it is known that in the area adjacent the screw flight 40, pellets frequently exist in solid form. Thus, as the particulate material is moved through the inlet portion 54 toward the outlet portion 56, the annular passage 64 allows particulate material to flow backward over screw flight 42 without squashing, prevents overfeeding of the material from the inlet portion 54 to the outlet portion 56 and substantially reduces scoring and abrasion of the land 58 and the bore 14.

As the material moves from the inlet portion 54 into the outlet portion 56 of the feed section 30, more of the material is plasticized. The material then moves from the outlet portion 56 into the transition section 34, where a further plasticization occurs. From the transition section 34, the material enters the metering section 36 where final plasticization occurs. The plasticized flow of material subsequently accumulates in a chamber 68 disposed at the outlet or metering end 38 of the rotary screw 28.

Conventionally, the screw means 28 is urged axially into the bore 14 by suitable hydraulic apparatus which exerts a force on the projecting end 32. As the plasticized material enters the chamber 68, pressure develops therein. Eventually the pressure in the chamber 68 acting on the area of the outlet end 38 exceeds the force on the projecting end 32. To maintain a longitudinal force equilibrium, the screw 28 is gradually displaced rearwardly from the bore 14.

When a sufficient volume, or shot, of plasticized material has been pressurized, plasticized and accumulated in the chamber 68, the rotary screw 28 has been displaced a predetermined distance from the barrel 12. The screw 28 is then forced axially forward into the barrel 12 to inject the properly measured charged of plasticized material into the adaptor 22 cummunicating with a suitable mold.

The significance of the length of the inlet portion 54 may now be readily explained. The length should exceed the predetermined distance by an amount greater than the longitudinal extent of the feed opening 16. Such a length ensures that the particulate feed material will be fed into the inlet portion 54 regardless of the position of screw 28 during its rearward movement with respect to the barrel 12.

During rotation of the screw 28, a pressure develops in the metering section 36, the transition section 34, and the outlet portion 56 thereby backpressuring the inlet portion 54. This backpressure acts on material conveyed forwardly by screw flight 40 of the inlet portion 54 apparently causing the material to move radially outwardly with respect to the screw flights 40 and into the annular space 64 through which the material may slip rearwardly over the screw flights 40 and into an upstream portion of the channel 44.

The material which slips over the land 58 is recirculated by rotary motion of the screw flight 40 and by entrainment with material in an upstream portion of the channel 44. The pressure and flow rate characteristics of the inlet portion 54 may be analogized figuratively to a centrifugal pump. More specifically, the inlet section 54 pumps material up to a pressure head and after that pressure head is attained the material slips by the screw flight 40 until material is displaced and the downstream pressure drops.

Thus, the effective length in which the plasticization primarily occurs appears to be the length of the screw having a full-height non-undercut screw flight. By virtue of the inlet portion of the feed section, this effective length is maintained constant.

It will thus be apparent that the inlet portion 54 of the feed section 30 encompasses a substantial portion of the length of screw 28. In addition, it will be noted that the undercut portion 54 provides multiple advantages in the operation of the injection molding apparatus: it minimizes scoring and abrasion on the interior surfaces of the barrel 12 and the land 58 of the screw flight 40 in the feed section 30 of the apparatus; it substantially eliminates overfeeding of material to the outlet portion 54 of the feed section of the rotary screw by permitting a substantial flow of material to move backward over the lands 58 of the undercut screw flights; and it provides a pressure relief system which reduces the torque required to rotate the screw.

Thus it will be observed that there has been provided in accordance with the invention, an injection molding machine which substantially satisfies the objects and advantages set forth. It is evident that many alternatives, modifications, variations and equivalents will be apparent to those skilled in the art in light of the foregoing disclosure of the invention. Accordingly, it is expressly intended that all such alternatives, modifications, variations and equivalents which fall in the spirit and scope of the invention as defined in the appended claims be embraced thereby.

What is claimed is:

1. Apparatus for masticating particles of solid synthetic resinous material to plasticize the same comprising:

a barrel having a generally cylindrical bore and a feed opening communicating therewith for supplying particles of synthetic resinous material to the interior of the bore; and a screw having two ends, being positioned in said bore and including:

an elongated generally cylindrical member with an exterior surface that defines a helical screw flight protruding outwardly from a screw root to a screw crest and including a shoulder on the screw flight, a feed section of small root diameter at one end of said screw, said feed section including an outlet portion downstream of said shoulder, and an inlet portion upstream of said shoulder and said outlet portion for receiving particles of synthetic resinous material and advancing the material into said outlet portion under pressure, a metering section of larger root diameter at the other end of said screw, a transition section between said feed section outlet portion and said metering section having a root diameter that progressively increases from said small root diameter of said feed section toward said root diameter of said metering section, said screw crest in close proximity to the bore wall and having a first diameter substantially throughout said metering section, said transition section and said feed section outlet portion, and having a second, smaller diameter in said feed section inlet portion, the screw crest of said feed section inlet portion radially spaced from the bore wall and cooperating therewith to define an unobstructed spaced around said feed section inlet portion that communicates with said feed openings, and permits back flow of particles of synthetic resinous material over said screw flight to limit the pressure built up in said feed section outlet portion so as to reduce the tendency of still unplasticized but pressurized particles to score the surface of said barrel bore and said screw.

2. The apparatus of claim 1 wherein:

said screw is designed for a reciprocation stroke of a predetermined length; and said inlet portion has a length exceeding said predetermined length such that feed material is supplied only to said inlet portion.

3. The apparatus of claim 1 wherein:

said shoulder is abrupt and is defined between said first diameter of said outlet portion and said second diameter of said inlet portion thereby minimizing the possibility that pressurized particles may become wedged between the screw flight of said outlet portion and the surface of the barrel.

4. The apparatus of claim 3 wherein:

said screw is a unitary member fabricated from steel.

5. A method of reducing wear on internal surfaces of an injection molding machine having a barrel with a generally cylindrical bore and a transverse feed opening, a rotatable reciprocable screw with a feed section including an undercut screw flight inlet portion and a full height screw flight outlet portion, a full height screw flight transition section and a full height screw flight metering section and means for rotating and reciprocating the screw to plasticize particulate synthetic resinous material which has a tendency to cause scoring and abrading of barrel bore and screw flight surfaces in a zone where the particles are forced into a restricted area during molding machine operation, said method comprising:

providing a radial clearance between the undercut screw flights of the inlet portion of the feed section of the screw and the barrel bore;

feeding particulate material to the inlet portion of the screw having said undercut flight portions;

pressurizing the material at the downstream end of the inlet portion of the screw having said undercut flight portions by rotating the screw internally of the bore of the barrel;

permitting some of the material to slip rearwardly through said radial clearance and over said undercut flight portions;

accumulating a shot of fluid resinous material at a downstream end of the screw;

displacing the screw rearwardly in response to the accumulating shot; and selecting the length of the undercut inlet portion such that the radial clearance receives particulate material throughout screw displacement so that a constant effective length of full height screw flights is spaced from the transverse feed opening throughout the displacement of the screw.

6. A method of providing a controlled feed pressure during the preparation of a shot of particulate material in an injection molding machine having a barrel with a screw-receiving bore and a screw with a predetermined length of substantially undercut screw flights in a feed section, said method comprising:

rotating the screw within the barrel at a generally uniform angular velocity;

feeding particulate material to the undercut screw flights of the screw and an annular space therearound;

conveying material forwardly through the machine by engaging the material with flights of the screw;

plasticizing the material while conveying it through the machine;

accumulating a quantity of plasticized material at the downstream end of the screw;

displacing the screw rearwardly during the step of accumulating;

backpressuring material at the downstream end of the undercut screw flights;

dragging material forwardly through the undercut screw flight section;

permitting slippage of material rearwardly over the undercut screw flights in response to the backpressure; and recirculating the material permitted to slip rearwardly for subsequent delivery to the downstream end of the undercut screw flights.

7. The method of claim 6 including selecting the predetermined length of undercut screw flights such that the axial length of full height screw flights between the feed opening and the downstream end of the screw has a constant value throughout reciprocation of the screw.

* * * * *